US006238176B1

(12) United States Patent
Buer

(10) Patent No.: US 6,238,176 B1
(45) Date of Patent: May 29, 2001

(54) METHOD OF LOADING RECYCLABLE CONTAINERS INTO TRAILERS

(75) Inventor: Jeffrey J. Buer, Norwalk, IA (US)

(73) Assignee: MidAmerica Recycling Company, Des Moines, IA (US)

( * ) Notice: Subject to any disclaimer, the term of this patent is extended or adjusted under 35 U.S.C. 154(b) by 0 days.

(21) Appl. No.: 09/465,688

(22) Filed: Dec. 17, 1999

(51) Int. Cl.[7] ........................ B65G 7/20

(52) U.S. Cl. ........................ 414/809; 414/400; 414/296; 100/215

(58) Field of Search ........................ 414/398, 400, 414/809, 296; 100/218, 229 R, 45, 215

(56) References Cited

U.S. PATENT DOCUMENTS 3,059,789 * 10/1962 Bowles ........................ 414/400 X
4,123,970 * 11/1978 Quante ........................ 100/215 X
4,256,434 * 3/1981 Stodt et al. ........................ 414/400 X
4,923,356 * 5/1990 Foster ........................ 414/400 X
5,765,986 * 6/1998 Hulls ........................ 414/400 X
5,890,426 * 4/1999 Grumkowski ........................ 100/215 X

FOREIGN PATENT DOCUMENTS

2820276 * 11/1979 (DE) ........................ 414/400

* cited by examiner

*Primary Examiner*—Frank E. Werner
(74) *Attorney, Agent, or Firm*—Henderson & Sturm LLP

(57) ABSTRACT

A method for automatically loading bags of recyclable containers into a trailer. The containers of plastic bags are put onto a conveyor, which delivers them to a loader having a ram to push the bags of containers into the trailer automatically. In a preferred embodiment, a computer assisted by electric eye sensors controls the number of strokes of the ram, and controls when the conveyor and loader is operating.

5 Claims, 8 Drawing Sheets

METHOD OF LOADING RECYCLABLE CONTAINERS INTO TRAILERS

BACKGROUND OF INVENTION

1. Field of Application

The present invention relates generally to a method and apparatus for loading bags of containers for recycling into a trailer, and more particularly to such an apparatus which is automatic.

2. Description of the Related Art

At collection points where soft drink cans and plastic bottles or the like are returned for recycling, which is often a grocery store or the like, aluminum cans are manually placed in plastic bags. Also plastic containers are manually placed in plastic bags. These bags are then closed. The bags are then manually loaded into a semi-trailer so that the trailer with recyclable containers therein can be taken to a recycle center for separation into bins of like materials. Typically, the cans are kept segregated from the bottles. Plastic bags full of cans go in one trailer and bags of plastic bottles go in another trailer. Because these bags of containers are manually loaded into trailers, this system is very labor-intensive. Consequently there is a need for a cheaper and easier way to load bags of recyclable materials into trailers.

BRIEF SUMMARY OF THE INVENTION

The present invention relates to a method and apparatus for automatically loading bags of recyclable containers into a trailer of a type having a floor, sidewalls, a front wall and a rear opening. The containers of plastic bags are put onto a conveyor which delivers them to a loader-type structure which is like a compactor but which in this case is not being used as a compactor. The loader structure is merely utilized to push the bags of containers into the trailer automatically.

An object of the present invention is to provide an improved method and apparatus for loading bags full of recyclable materials into a trailer.

Another object of the present invention is to provide an automatic apparatus for loading bags of recyclable containers into a trailer or the like.

A further object of the present invention is to use a conveyor and a loading structure controlled by a pair of photo cells and a computer to automatically load bags of recyclable materials into a trailer or the like.

Other objects, advantages, and novel features of the present invention will become apparent from the following detailed description of the invention when considered in conjunction with the accompanying drawings.

DETAILED DESCRIPTION OF THE INVENTION

Figure 1:
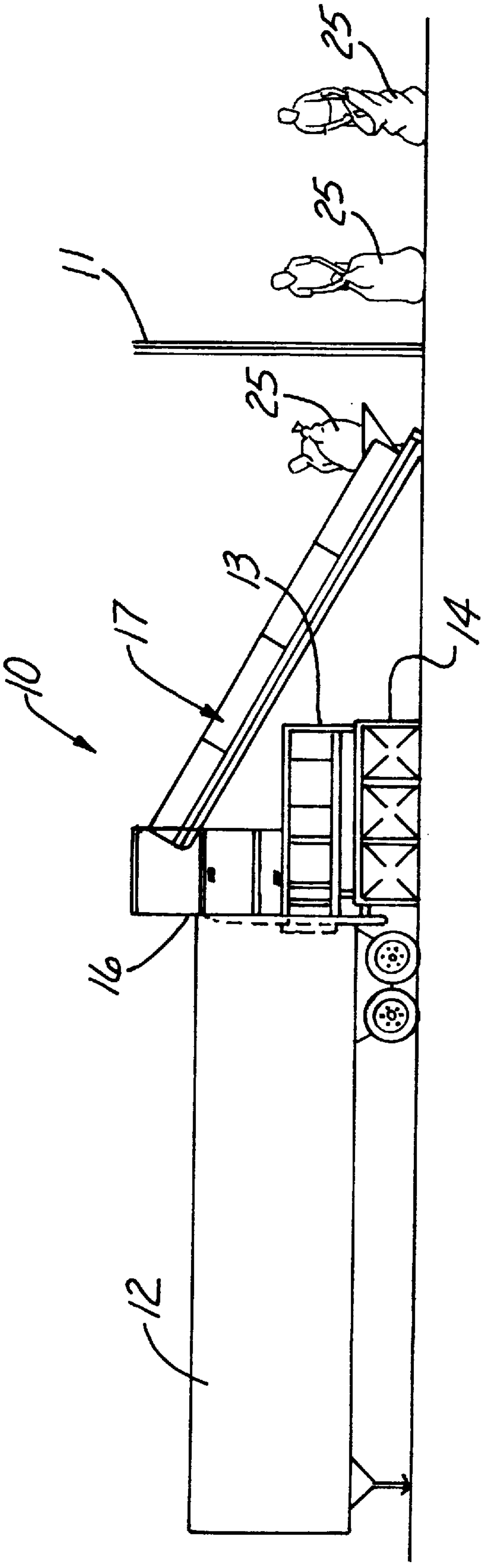
FIG. 1 is a side elevational view of a preferred embodiment of the present invention shown next to a trailer and showing how a conveyor and a loading structure is used to load bags of recyclable containers into a trailer.

Referring now to the drawings wherein like reference numerals designate identical or corresponding parts throughout the several views, FIG. 1 shows the present invention (10) adjacent to a building (11) for loading bags of recyclable materials into a trailer (12). A loader (13) is placed on a pedestal (14) so that the loader (13) will be at a proper height and position with respect to the trailer (12), it being understood that the pedestal (14) could merely be a standard loading dock instead of a pedestal.

A hopper (16) is disposed above the loader (13) and has a conveyor (17) extending into the top end thereof, with the bottom end of the conveyor (17) being ready to accept bags full of containers to be recycled.

Figure 3:
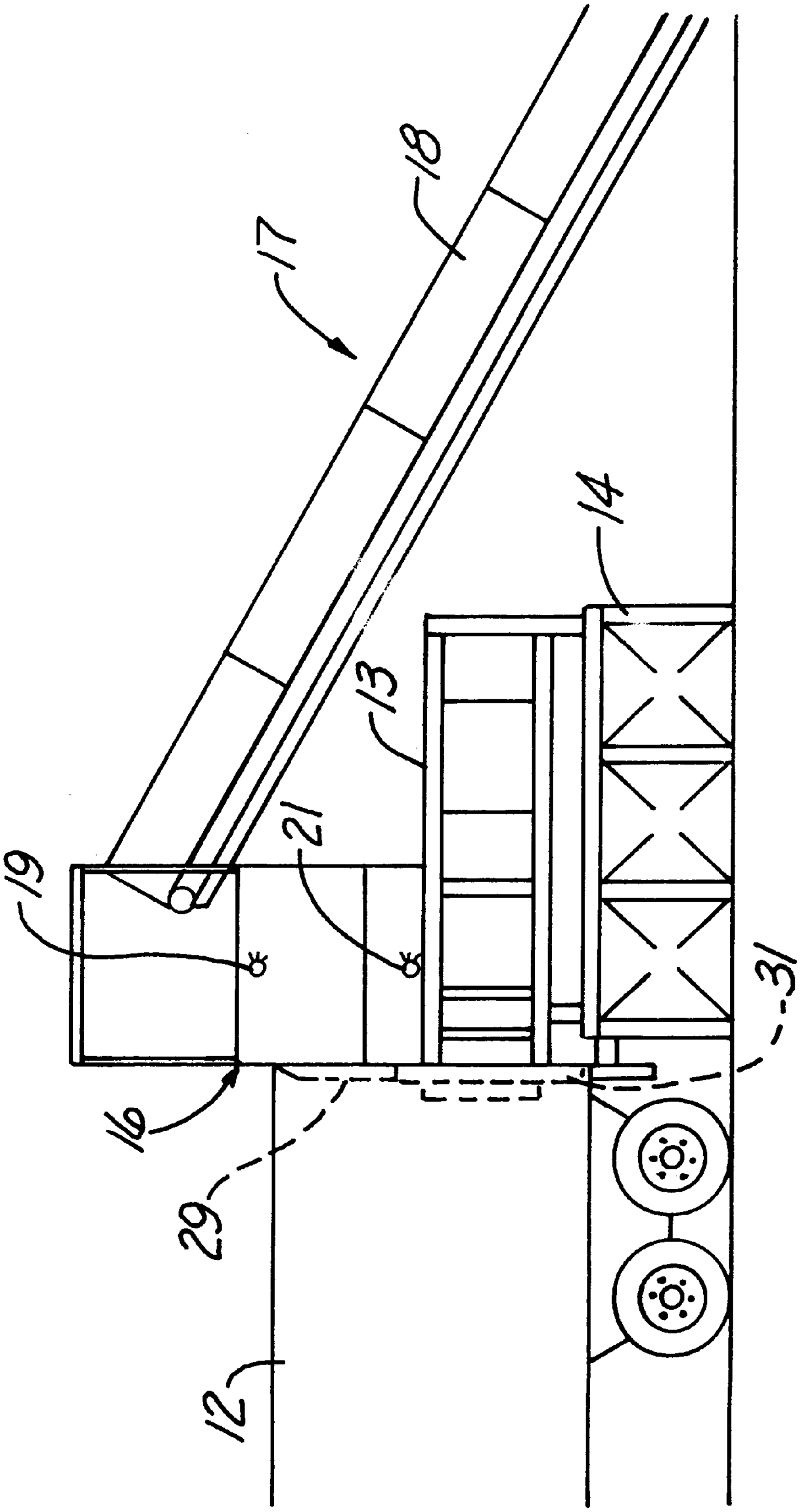
FIG. 3 is an enlarged elevational view similar to FIG. 1 but showing only a portion of the trailer and conveyor while showing other parts of the invention.

Referring to FIG. 3, it is noted that the conveyor (17) has side boards (18) for preventing the bags from falling off the sides and the top thereof is typically enclosed if it is outside of the building, whereas it is not covered if it is inside a building. The hopper (16) includes a photo cell (19) and a photo cell (21) which will be explained below. The loader (13) is constructed like a compactor except it is important to note that it is not being used as a compactor. A compactor typically operates off of pressure and pushes against something until a certain pressure is achieved after which it automatically stops, whereas this loader (13) always has the same stroke length every time and is merely intended to push bags of containers into the trailer and not to compact them.

Figure 4:
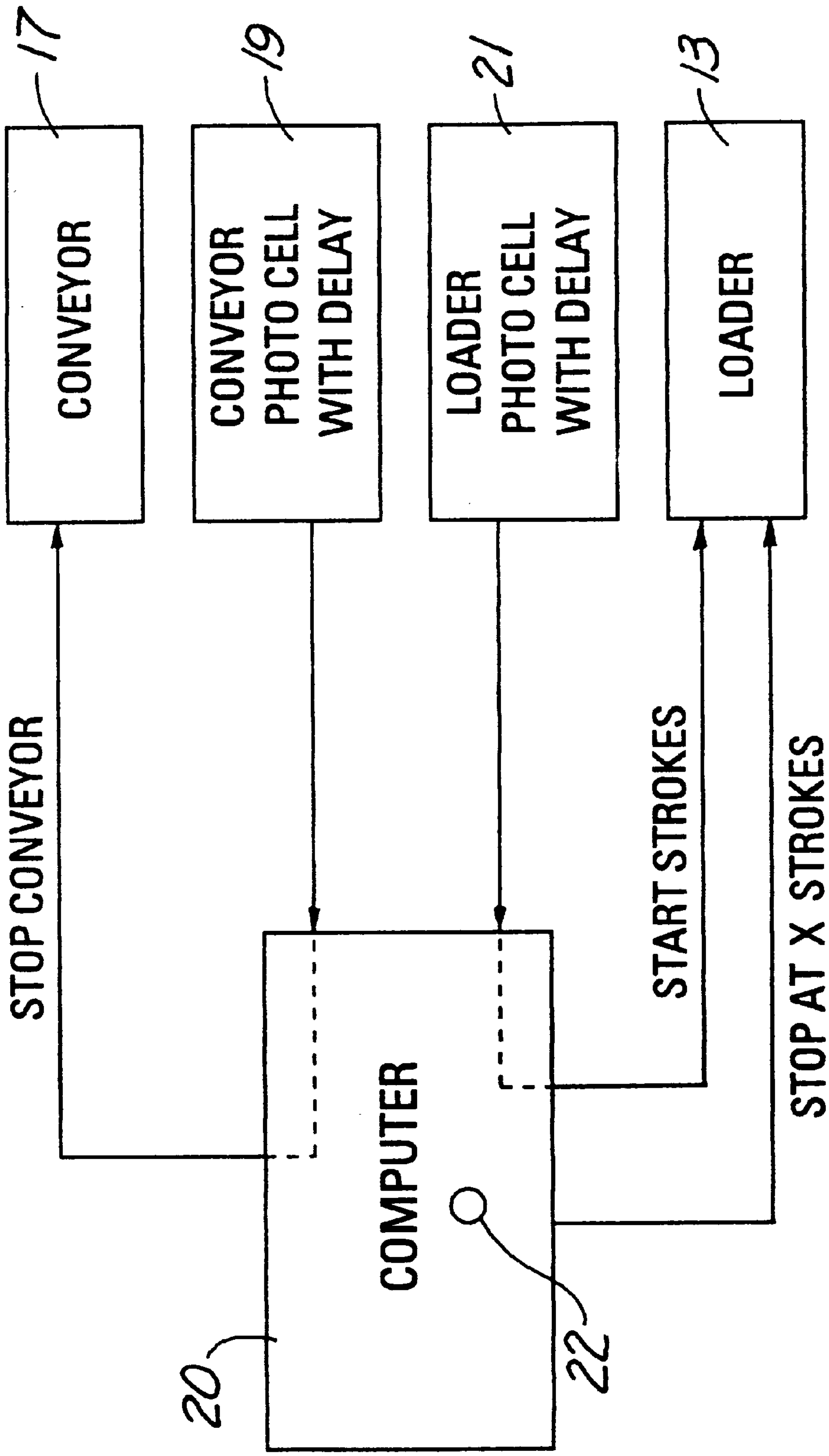
FIG. 4 is a schematic view of a computerized portion of the present invention.
Figure 5:
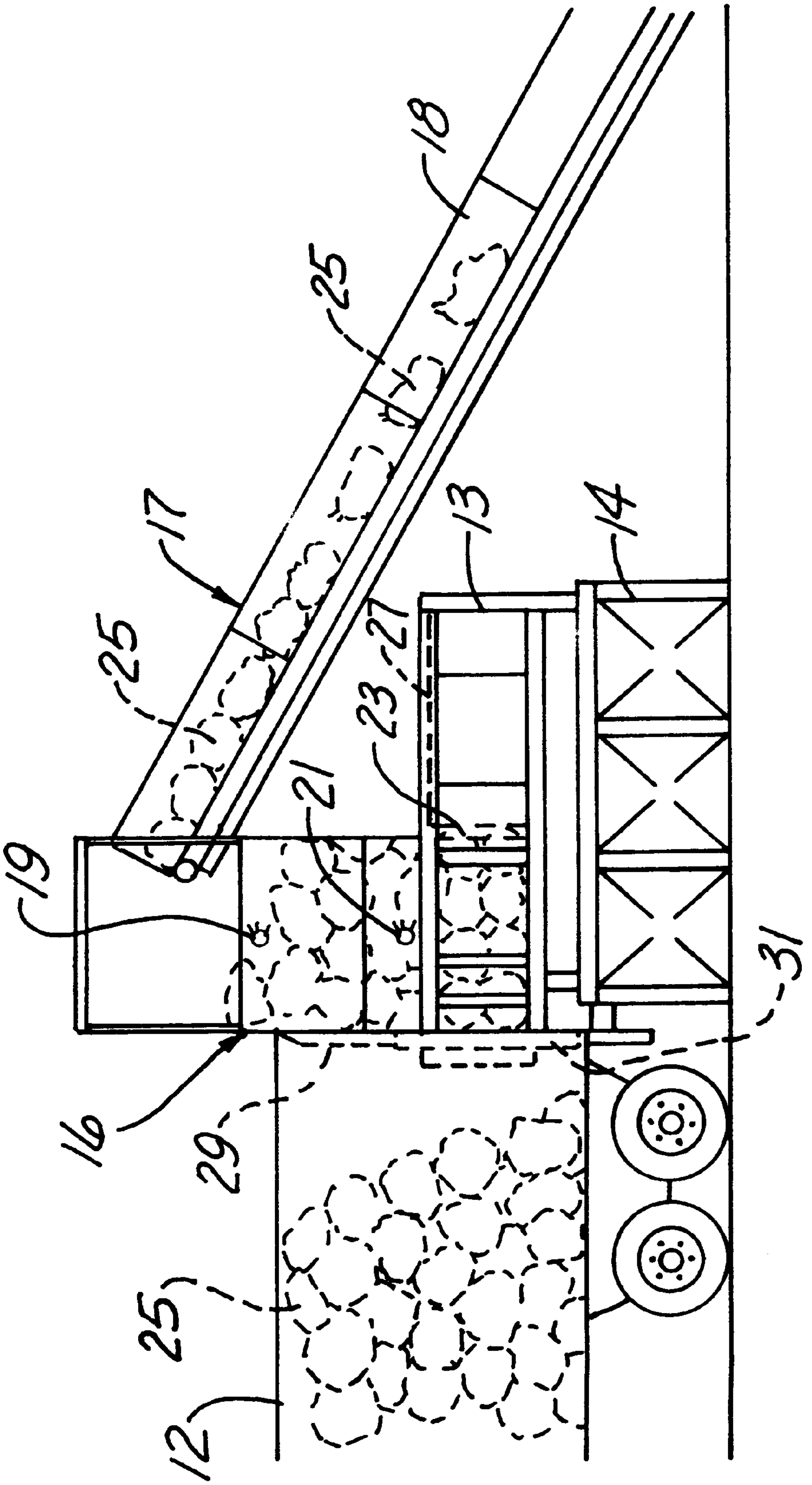
FIG. 5 is a view like FIG. 3 but showing the bags of recyclable containers going from a conveyor to a hopper above a loader and showing how the bags are pushed with a ram into a trailer.

Referring to FIG. 4, it is noted that a computer (20) is used to control the apparatus shown in FIG. 5. The computer (20) is set to extend and then retract a ram (23) shown in FIGS. 6 and 7. This extending and retracting is done hydraulically by a pump (not shown) associated with the loader (13). Hydraulic cylinders (not shown) can be used in association with the pump. Any standard compactor structure can be used as a loader (13). Because no compaction is desired, the trailer is not anchored with respect to the loader (13), other than the normal step of applying the brakes on the trailer and/or using wheel chokes.

Figure 6:
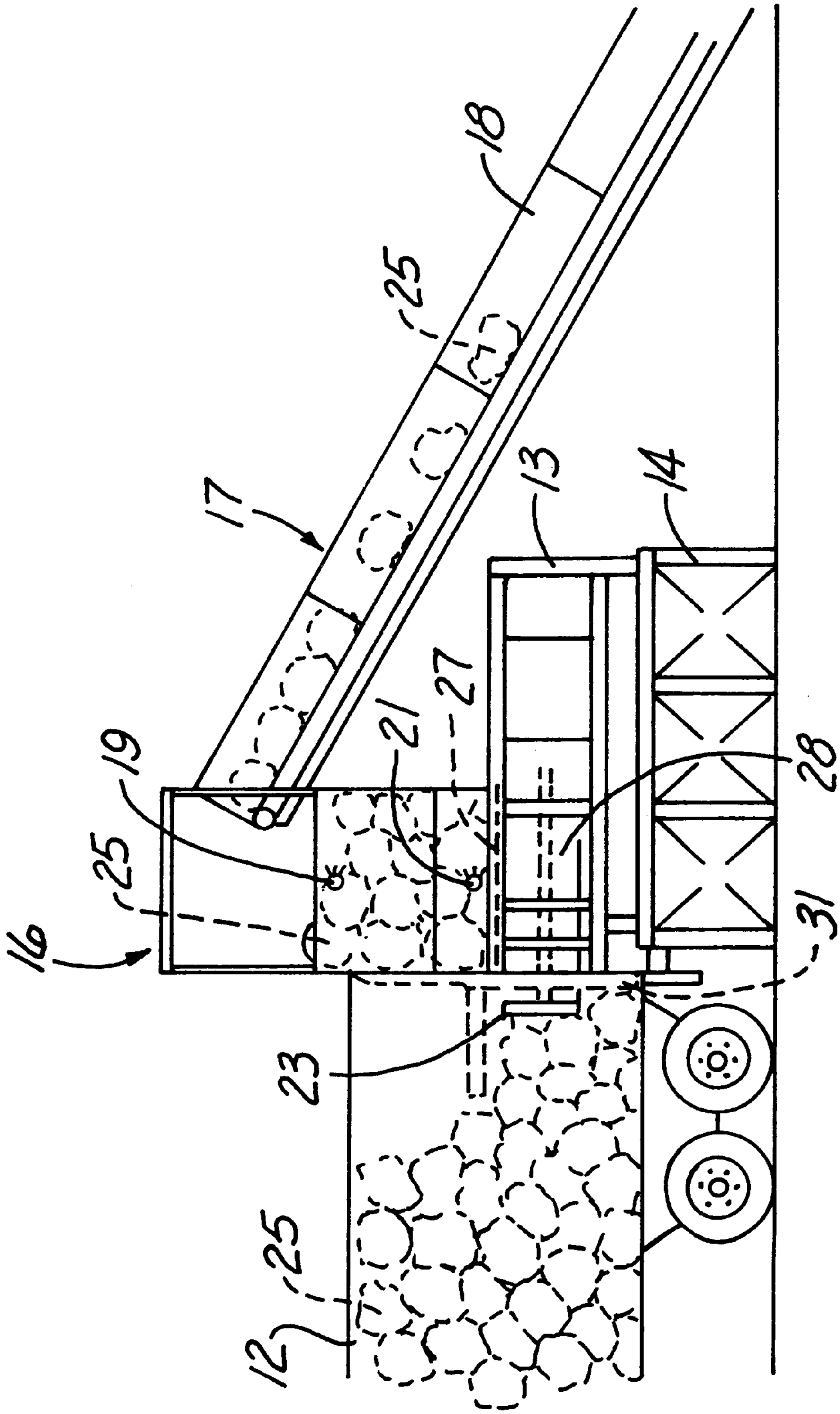
FIG. 6 is a view like FIG. 5 but showing the ram pushing bags of containers into the trailer.
Figure 7:
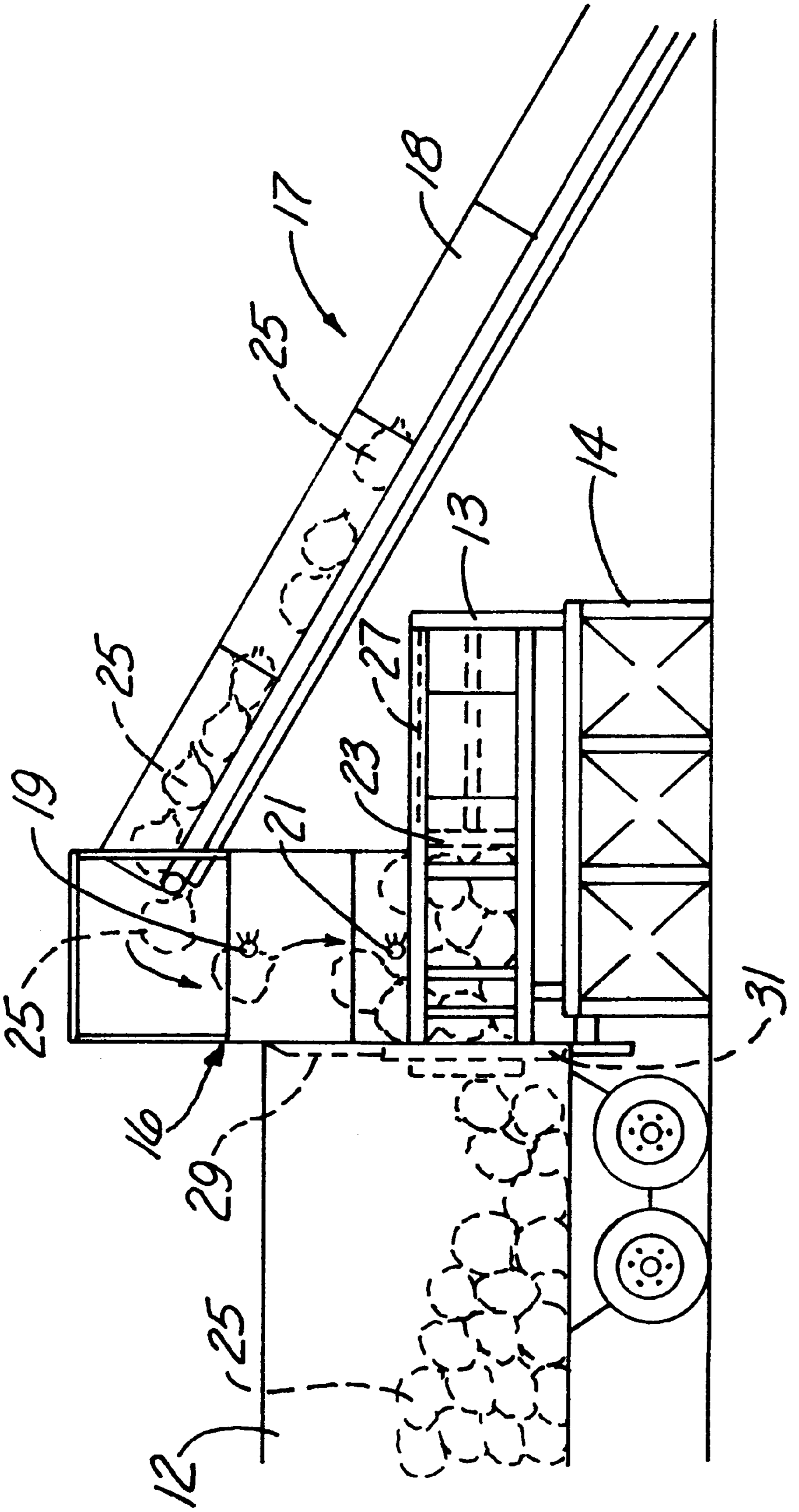
FIG. 7 is a view like FIGS. 5 and 6 but showing the ram of the loader retracted and showing how the bags enter the chamber of the loader from the hopper and conveyor.

Referring to FIGS. 4 and 7, it is noted that as long as the bags (25) of the cans or plastic bottles are dropping off of the conveyor (17) and dropping quickly past the loader photo cell (21), there is no signal sent to the computer (20) because the photo cell (21) has a three-second time delay. Once the bags pile up in front of the loader photo cell (21), a signal is sent to the computer (20) to begin a stroke of the ram (23), for example, to move the ram from the position shown in FIG. 7 to the position shown in FIG. 6. The bags that are in front of the ram (23) and below the hopper will be pushed to the left as shown in FIGS. 6 and 7 at the same time that the ram (23) moves to the left from FIG. 7 to FIG. 6. A horizontal plate (27), which is attached to the ram structure (23) and moves with the ram back and forth, slides under the bags (25) above it to the position shown in FIG. 6 as the ram (23) moves, to keep the bags (25) from falling into the chamber (28) while the ram (23) is in the position in FIG. 6. This plate (27) only allows bags to drop into the chamber (28) as it moves back to the position shown in FIG. 7 in dashed lines. This plate (27) is essentially just a rectangular plate, although it is only shown in one edge view in FIGS. 6 and 7.

As the bags (25) pile up in the hopper (16), for example as shown in FIG. 6, they will eventually cover up the photo cell (19). The photo cell (19) is designed to have a three-second delay, and is in that respect just like the photo cell (21) which controls the stroking of the compactor ram (23). Once the bags (25) pile up and are in front of the photo cell (19) for more than the predetermined delay time of three seconds, for example, a signal is sent from the conveyor photo cell (19) to the computer (20) and the computer (20) shuts off the conveyor (17) so that bags do not pile up and start dropping off the top of the hopper (16).

Figure 8:
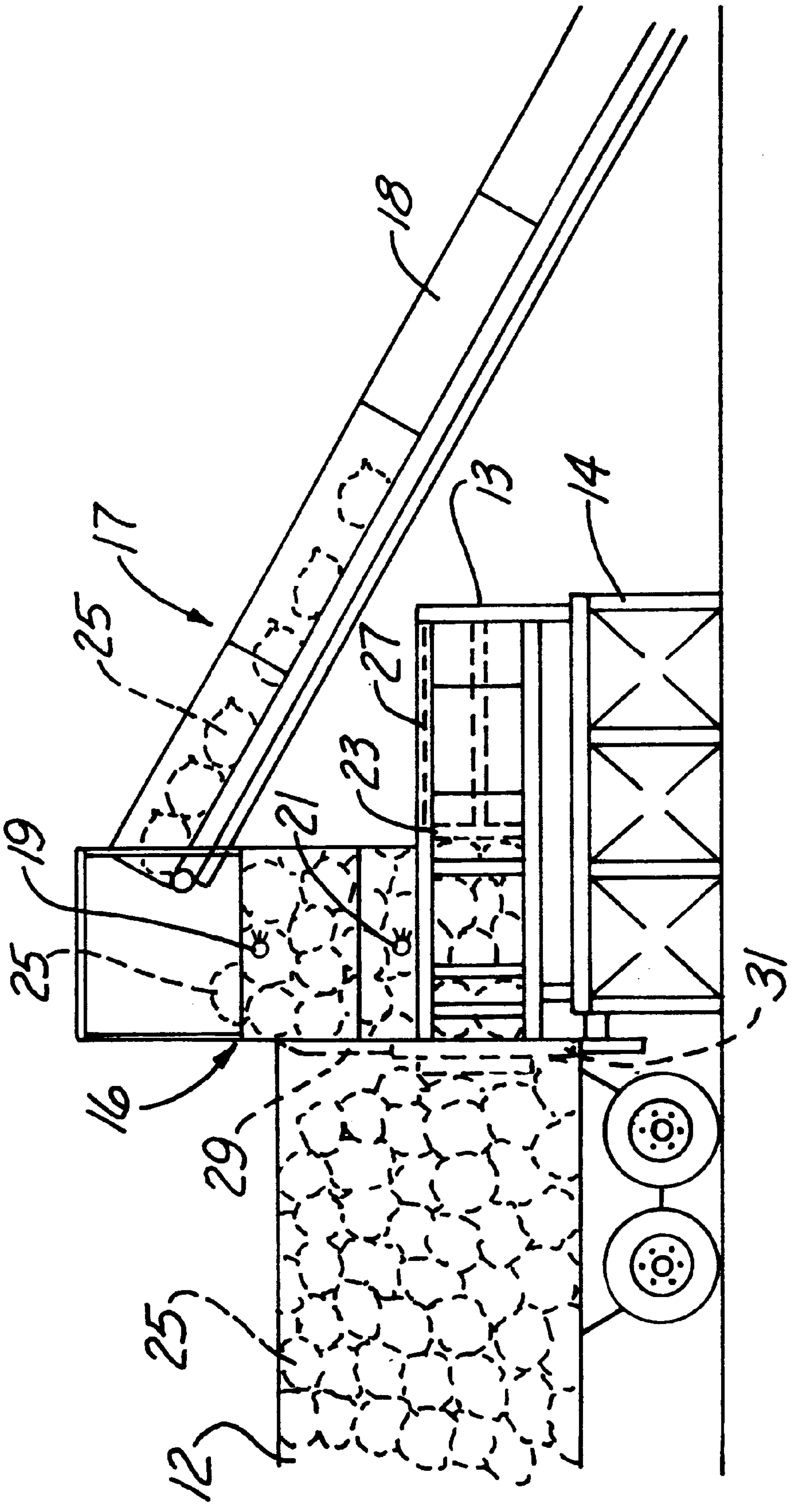
FIG. 8 shows a view just prior to the last stroke of the loader with the trailer nearly full of plastic bags full of containers.

The computer (20) is programmed to deliver a predetermined number of strokes, X, and then to shut off the pump (not shown) of the loader (13). This prevents compaction of the bags within the trailer (12), which would cause damage to the trailer itself and furthermore would cause the cans or bottles to be compacted and therefore be very difficult to separate later. Easy separation of the containers in the plastic bags at the recycling center is extremely important for recycling purposes. For example, in a typical trailer that is 53-feet long, the compactor/loader (13) is set to make one hundred strokes before it shuts off. The computer (20) also is set so that when eighty-percent of the strokes have been completed, a light (22) begins to flash to tell the operator that it is getting close to the time when a new trailer will need to be brought in and the loaded trailer (12) removed. When one hundred percent of the pre-determined strokes of the ram (23) are done, i.e., one hundred strokes in this example, the light (22) is set to be "On" continuously to indicate to the operator that the trailer (12) is completely full and should be removed and replaced with an empty trailer. This will occur, for example, at the time shown in FIG. 8 wherein the last stroke of the ram (23) is just ready to occur.

Figure 2:
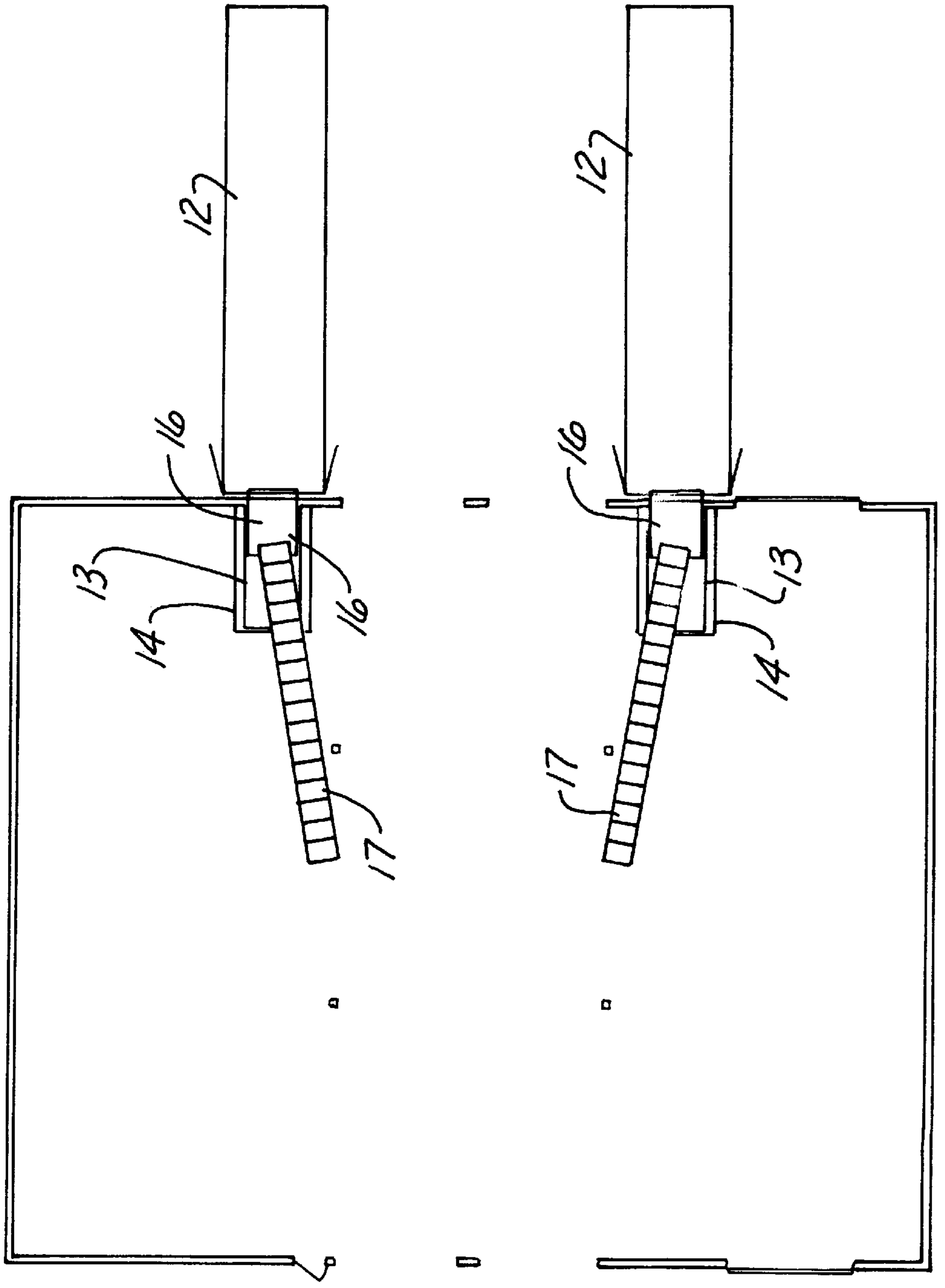
FIG. 2 is a top plan view of the present invention shown in a preferred layout in a portion of a building.

Referring to FIG. 2, it is noted that a portion of the device can be inside of a building, but is also to be understood that all or any part of the system can be outside of the building. One perhaps desirable arrangement would be that only the bottom input portion of the conveyor (17) would be inside the building and the rest of the structure could be outside of the building, for example, during winter conditions.

A canvas or nylon curtain (29) prevents the bags in hopper (16) from just dropping in the top of the back opening of the trailer (12). The curtain (29) is attached to the roof and sides of the trailer and directs the bags (25) into the chamber (28) of loader (13). The curtain (29) has an opening in it the size of the loader and surrounds the part of the loader (13) that extends into the trailer (12). Part (31) is one end of the housing of the compactor/loader (13).

Accordingly, it will be appreciated that the preferred embodiment shown herein does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A method of loading containers into a trailer comprising:

(a) parking a trailer, having a floor, sidewalls, a front wall and a rear opening, near a building, having sidewalls and a floor where uncompacted recyclable containers are collected;

(b) placing the uncompacted containers in a plurality of plastic bags and closing the bags to keep the uncompacted containers inside the bags;

(c) placing the bags of uncompacted containers on a conveyor;

(d) placing a loader with a ram adjacent the rear opening of the trailer, said loader having an inlet opening;

(e) conveying the bags of containers, using the conveyor, into the inlet opening of the loader; and (f) using said ram to make a plurality of strokes to push the bags of uncompacted containers towards the front wall until said trailer is at a predetermined degree of fullness without causing undue compaction of the containers whereby the containers will easily separate from each other substantially uncompacted when the plastic bags are later removed from around the containers.

2. The method of claim 1 wherein said predetermined degree of fullness of the trailer is determined by the size of the trailer and using a predetermined number of strokes of the ram.

3. The method of claim 2 including sensing a first level of bags of containers within said loader and causing said ram to make one of said strokes to push the bags of containers toward said front wall whenever said sensing of bags to said first level occurs unless said predetermined number of strokes has occurred.

4. The method of claim 3 including sensing a second level of bags of containers within said loader which is higher than said first level and stopping the conveying of bags to said loader when said bags of containers reach said second level.

5. The method of claim 4 including automatically starting again the conveying of the bags of containers to said loader whenever no bags of containers are sensed at said second level.

* * * * *